Figure 1:
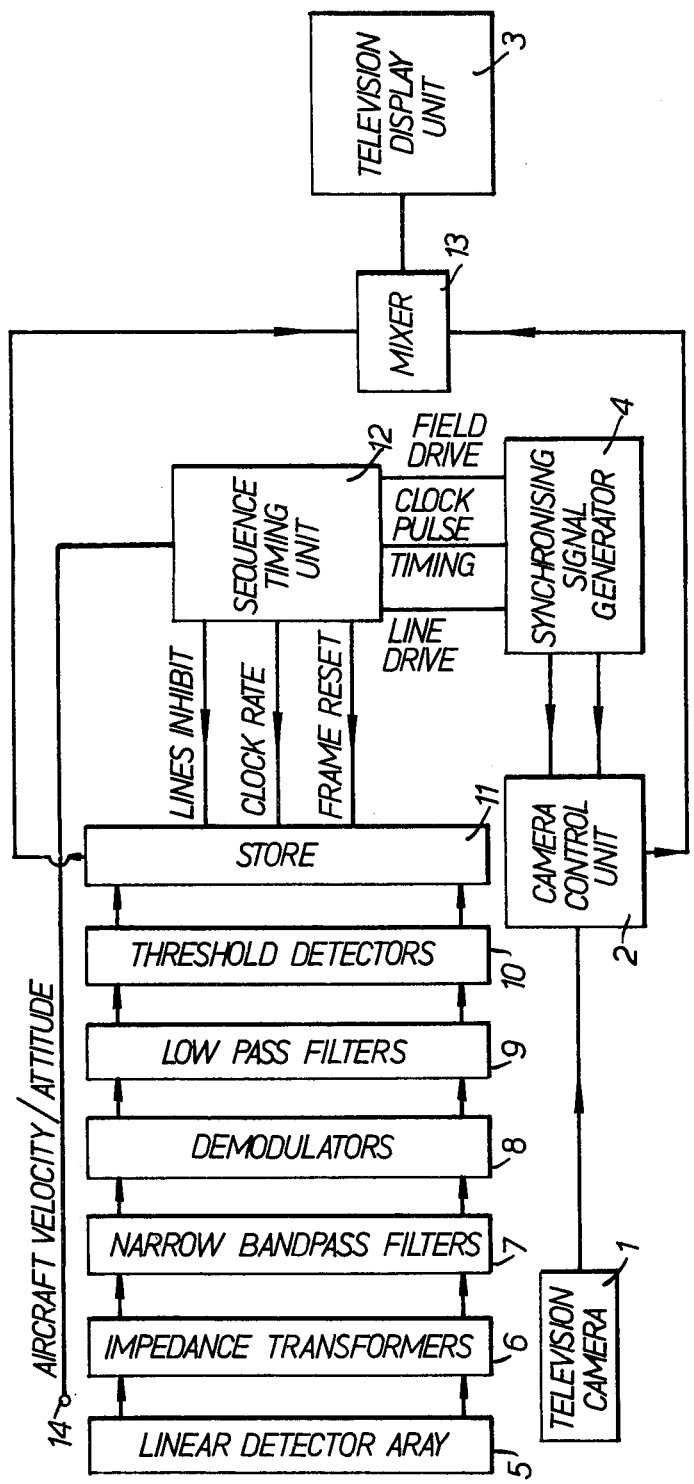

United States Patent [19]

Sarson et al.

[11] 4,118,733
[45] Oct. 3, 1978

[54] SURVEILLANCE ARRANGEMENT INCLUDING A TELEVISION SYSTEM AND INFRARED DETECTOR MEANS

[75] Inventors: Alan Elmer Sarson; William James Rowley Clark, both of Great Baddow, England

[73] Assignee: Elliott Brothers (London) Limited, London, England

[21] Appl. No.: 671,449

[22] Filed: Mar. 30, 1976

[51] Int. Cl.$^2$ .................. H04N 7/18; H04N 5/33; H01J 31/49
[52] U.S. Cl. .................................... 358/109; 250/332; 358/113; 358/212
[58] Field of Search .............. 250/330, 332, 333, 334; 358/113, 212, 109

[56] References Cited

U.S. PATENT DOCUMENTS

| 3,571,504 | 3/1971 | Kiuchi et al. ........................ 358/113 |
| 3,591,713 | 7/1971 | Olsson et al. ................... 178/DIG. 8 |
| 3,641,261 | 2/1972 | Chaplin et al. ..................... 250/203 R |
| 3,730,985 | 5/1973 | Whitney ........................ 178/DIG. 8 |
| 3,742,136 | 6/1973 | Olsson ................................ 358/113 |
| 3,786,269 | 1/1974 | Cooper ................................ 250/334 |
| 3,854,821 | 12/1974 | Thompson .......................... 356/152 |
| 3,876,308 | 4/1975 | Alpers ................................ 356/152 |

*Primary Examiner*—S. C. Buczinski

*Attorney, Agent, or Firm*—Baldwin, Wight & Brown

[57] ABSTRACT

The invention provides a surveillance arrangement, and in particular an airborne surveillance arrangement, in which a television display of a scene is brightened up, by means of infra-red detectors, to emphasize heat emitting targets.

In one example of airborne surveillance system, a linear array of infra-red detectors is arranged to view part of a scene viewed by a television camera, with the same horizontal field of view at a desired target range. In front of the array of detectors a light chopper is provided so that the output of each detector is a modulated carrier. The output of each detector is applied to a store, via individual impedance transformers, narrow band-pass filters and demodulators. Between each demodulator and the store, individual sharp cut-off low pass filters and threshold detectors may be provided to provide a degree of discrimination against spurious responses. The store is read-out under the control of a sequence timing unit which is synchronized with the synchronizing signal generator of the television camera and the video output of the latter is mixed with the output from the store prior to application to a display unit so that the display provided is a scene of an area towards which the aircraft is flying with heat emitting targets highlighted.

11 Claims, 4 Drawing Figures

SURVEILLANCE ARRANGEMENT INCLUDING A TELEVISION SYSTEM AND INFRARED DETECTOR MEANS

This invention relates to surveillance arrangements and in particular, though not exclusively, to passive surveillance arrangements for use in military aircraft for detecting surface targets ahead of the aircraft.

Particularly for use at night or in poor visibility, passive surveillance arrangements have been developed which present an operator with a display of an area towards which the aircraft is flying. One such is a low light level television system consisting of a low light level television camera tube, e.g. an electron bombardment silicon vidicon, arranged to view the surfce area of interest (i.e. the target area) ahead of the aircraft and a television display unit presenting a picture of the scene viewed by the camera.

Because of the development of highly efficient surface-to-air weapons systems, military aircraft are increasingly required to operate over a battle area at high speed and at low level in order to take maximum advantage of terrain screening. As a direct consequence, target detection ranges are also limited by terrain screening so that the time for reaction between target acquisition and target engagement becomes very short.

It is therefore important that the time lag between the appearance of a portential target on the display and its visual detection by the operator be as short as possible. As is well known however, the search time for a target against a background on a display is dependent upon the displayed target size and its contrast. Of necessity the displayed target size is small at the moment it first appears on the display if the ground coverage of the system is to be acceptably large. Often, however, the contrast of a target against its background because of the nature of the background or because of camouflaging, is poor with known television systems of the kind mentioned above.

From the point of view of the detection of a target so called FLIR (forward looking infra-red) systems offer considerable advantage compared with the television type of system. The most efficient of the known FLIR systems consist of a cryogenically cooled mercury cadmium telluride detector which is caused to scan an area ahead of the aircraft by means of a scanning optical system comprising a rapidly rotating polygon. Known FLIR systems of this kind tend to be complex and expensive and furthermore, it has been found that with known FLIR systems in general, it is often difficult to interpret the background appearing in the display.

The present invention seeks to provide an improved surveillance system in which one or more of the above difficulties is reduced.

According to this invention a surveillance arrangement comprises a television system including television camera means for viewing a scene, a television display arrangement for displaying the scene viewed by said television camera means and infra-red detection means for viewing part of the same scene to provide brighten-up signals for said display to highlight heat emitting targets in said part of said scene.

Preferably said arrangement is an airborne arrangement and said camera is arranged to view an area (hereinafter called the target area) of the surface over which the aircraft is to fly lying ahead of the aircraft.

Preferably said infra-red detection means comprises an array of individual infra-red detectors extending at right angles to the flight path of said aircraft and imaged into space so as to have substantially the same horizontal field of view at a desired target range as the television system.

Normally said linear array of individual infra-red detectors is mounted on a platform which is stabilised at least against roll.

Preferably said desired target range is the range to the centre of the target area viewed by said television camera.

Preferably the output of each individual infra-red detector is arranged to be stored in a storage means, means are provided for reading out signals stored by said storage in due time, and means are provided for mixing signals read out from said store with video signals applied to said television display arrangement, whereby said read out signals act to brighten-up areas in the television display which correspond to the position of a heat emitting target in the target area.

Said infra-red detectors may be pyro-electric detectors of the TGS or $PVF_2$ type, but preferably said infra-red detectors are thermo-electrically cooled mercury cadmium telluride detectors.

Preferably means are provided for chopping radiation falling upon said detectors so that the output of each detector comprises a carrier frequency, dependent upon the frequency of chopping, upon which wanted signals appear as modulation and the output of each detector is applied via individual impedance transforming means, individual narrow bandpass filter means and individual demodulating means to said storage means.

Preferably between each individual demodulating means and said storage means is provided sharp cut-off low pass filter means and preferably again individual threshold detectors are provided for the output of each of said detectors whereby a degree of discrimination may be provided against responses which are not due to possible targets.

In a possible modification said array of infra-red detectors extending at right angles to said flight path is replaced by an array extending in the vertical, and means are provided for scanning the field of view of said last mentioned array in the horizontal whereby the period of time in which a target in any given case provides response signals is relatively increased. The number of detectors in said array extending in the vertical may be less than the number of detectors in the array extending in the horizontal whereby whilst the period of time in which a target in any given case provides response signals is relatively increased, the numbers of electronic channels required is decreased in the ratio of the numbers of elements in the two arrays. As an alternative however means may be provided for linearly projecting the computed position of a highlighted target at the time of detection, across said display.

Figure 2:
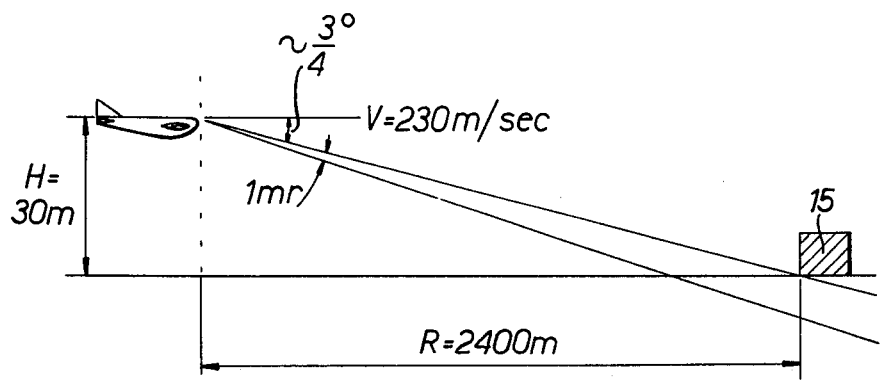
Figure 3:
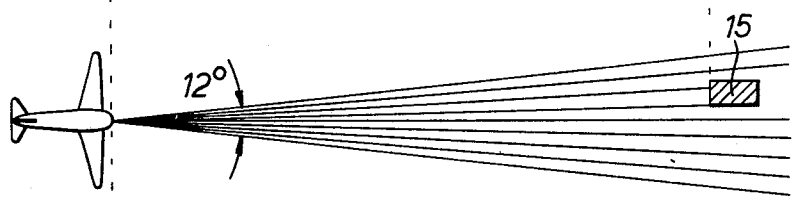

The invention is illustrated in and further described with reference to the accompanying drawings in which, FIG. 1 is a block schematic diagram of an airborne passive surveillance arrangement in accordance with the present invention FIGS. 2 and 3 are diagrams illustrating the overall infra-red systems geometry for the system of FIG. 1.

Figure 4:
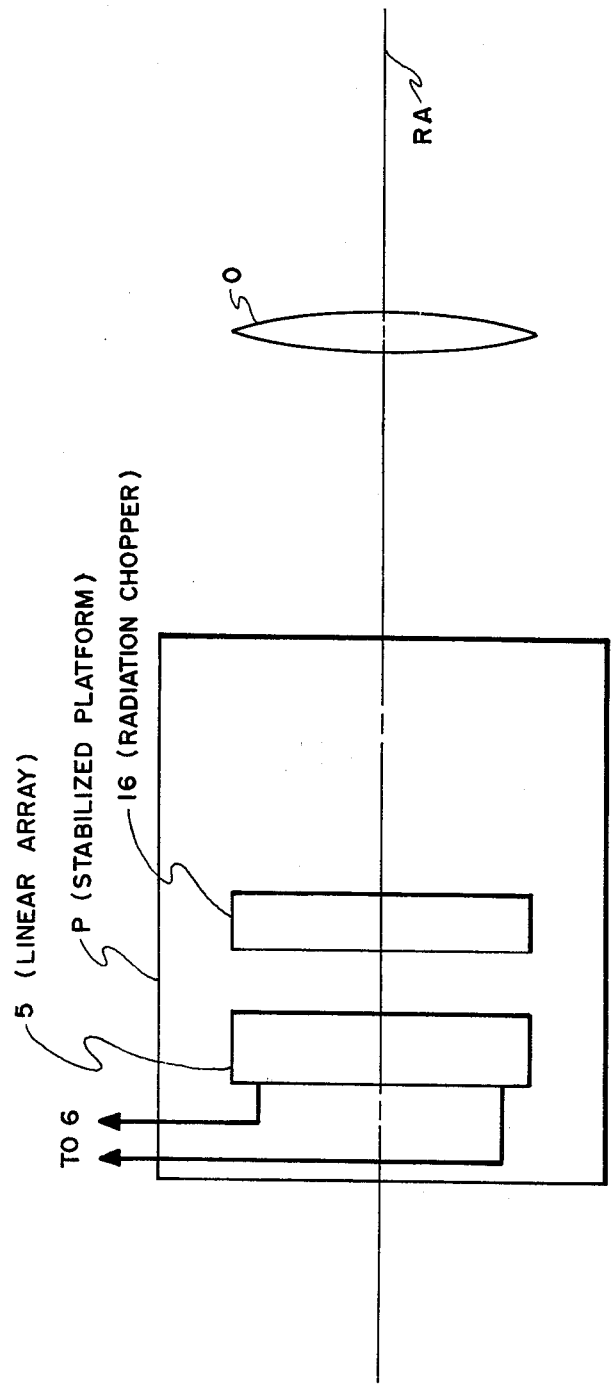

FIG. 4 is a schematic plan view illustrating the stabilized mounting for the infra-red detector, the chopper and imaging system.

Referring to FIG. 1, a low light level television camera 1, utilising for example an electron bombardment silicon vidicon camera tube, is mounted on the air frame of an aircraft (not shown) and arranged to view through an imaging system (not shown) a target area of ground surface centred on a point 2400 meters directly ahead of the aircraft when flying at a height of 30 meters. The camera 1 is stabilised to a first order only to reduce high frequency vibration, since the eventual presentation in this example is of the head-up display kind.

Output from the camera 1 is applied via a camera control unit 2 to a television display unit 3 sited at some convenient position for the pilot or the observer. The camera control unit 2 derives synchronising signals from a synchronising signal generator 4.

As so far described the system is similar to a known airborne low light level television surveillance system. Appearing upon the display unit 3 will be a television display of the target area.

In addition to the television camera 1 viewing ahead towards the camera area a linear array of infra-red detector elements 5 extending horizontally at right angles to the flight path views a part of the target area through an infra-red imaging system coaxial with the imaging system of the television camera 1. The horizontal field of view of the array of infra-red detectors is matched to that of the television camera 1 at a desired target range, for example the range to the centre of the target area. Specifically in this embodiment, 128 individual infra-red detector elements are arranged in the linear array 5, each element being a mercury cadmium telluride detector or a pyro-electric detector, such as the TGS or $PVF_2$ type (e.g. a type VX 8577 detector), of dimensions 0.2 mm wide and 0.25 mm high. The array 5 is arranged close to the focus of the imaging system which consists of a forward looking 12 cm diameter objective O of 20 cm focal length (aperture $f/1.67$) covering 9° in azimuth. With this optical system, the instantaneous field of view of each detector element would be 3 meters high by 2.4 meters wide at a range of 2400 meters if the aircraft is flying at a height of 30 meters. This corresponds to the 3 by 3 meters usually assumed to represent the size of a tank at this range. The detector array is mounted on a stabilised platform in or under the nose of the aircraft. This stabilised platform is shown in FIG. 4 and is represented therein by the reference character P. The platform P is stabilised about its roll axis RA against roll (since otherwise in conditions of roll, only the detector element on the roll axis would remain in focus at the target range) in manner well known per se. Additionally, although less necessarily since manual correction could be resorted to, the stabilised platform is stabilised against height and pitch variations to ensure that the target range remains constant.

In front of the array of detectors, and close to the focal point of the optical system, as shown in FIG. 4, is a radiation chopper 16 (as known per se) provided to chop the incoming radiation falling on the array of detectors to produce in the output of each detector a carrier of 1 KHz modulated with the required signal.

The output of each individual infra-red detector in the array is applied to an individual impedance transformer within block 6 (each consisting of a JFET followed by an Operational Amplifier). These individual impedance transformers are provided to overcome the high impedance of the detectors and produce $1/f$ noise which adds to the noise from the detectors themselves.

The output of each impedance transformer is applied to an individual matched narrow bandpass filter centred on the 1 KHz carrier freqency in order to remove $1/f$ noise near zero frequency. These narrow bandpass filters are represented as being within the block 7.

The output of each individual matched narrow bandpass filter is applied to an individual demodulator which removes the 1 KHz carrier. These individual demodulators are represented as being within block 8.

The output of each individual demodulator is applied to an individual sharp cut-off low-pass filter within block 9 provided to remove any residual noise at frequencies above the useful top limit of the signal spectrum.

The output of each individual low-pass filter within block 9 is applied to an individual threshold detecctor within block 10, these being provided to provide a degree of discrimination against responses which are not due to possible targets of interest.

The output of each threshold discriminator within block 10 is applied to a sequential store 11. The signals stored in store 11 are read out under the control of a sequence timing unit 12 which provides clock rate, frame reset and lines inhibit pulses in synchronism with the signals produced by synchronising signal generator from which the sequence timing unit is arranged to obtain line drive, field drive and clock pulse timing signals. Signals thus read out from store 11 are mixed in a mixer 13 with television picture signals from camera control unit 2 so as to provide brighten-up signals highlighting heat emitting potential targets at the target range in the television display presented by display unit 3. The purpose of providing "lines inhibit" signals is so that only a small block of lines in the television signal may be subject to brightening-up, a sufficient number of lines in fact to "bracket" the length of a likely target in the field of view at the target range.

Aircraft velocity and attitude signals derived from transducers associated with the stabilised platform upon which the linear array 1 of detectors is mounted are applied via terminal 14 to the sequence timing unit 12 in order to correct the co-ordinates of brightening-up in the television display field for departures in level, constant velocity, flight.

Referring to FIGS. 2 and 3, these will be largely self explanatory having regard to the above description given with reference to FIG. 1. The field of view of the infra-red detector array is shown depressed by an angle of ¾° and covering 12° in azimuth. FIGS. 2 and 3 are, of course, not drawn to scale. A typical target is represented at 15. The target range R, that is to say the range at which one or more of the infra-red detectors will first detect signals from the target 15 is 2400 meters if, as shown, the aircraft is flying at a height of 30 meters. FIG. 2 may be utilised to illustrate the bandwidth required of the infra-red detection system. The aircraft is assumed to be travelling at a constant speed of 230 meters/second at a height of 30 meters above flat ground. The axis of the infra-red system is depressed by ¾° to intersect the ground 2400 meters ahead of the aircraft. A point detector placed at the focal point of the system "sweeps" the ground 2400 meters ahead until it comes to a vertical obstacle which it then scans in a time $t$, given by:

$$t = h \cot\theta / v$$

where

θ is the depression angle
h is the height of the obstacle
v is the aircraft velocity in meters/second
For a 3 meter high obstacle and the given range, velocity and height:

$$t = \frac{3 \times \frac{2400}{30}}{230} \approx 1 \text{ second}$$

Thus, mainly because of the small angle of depression required, the bandwidth required is small compared with a FLIR system utilising a scanning detector. This permits the use of relatively unsophisticated infra-red detectors, i.e. of the TGS or $PVF_2$ type or of the thermo-electrically cooled mercury cadmium telluride type rather than detectors of the cryogenically cooled mercury cadmium telluride type and so avoid the cooling problems associated with the latter.

With the system described above, target highlighting will only occur for a period of time corresponding to the time taken for the infra-red system to scan the target. As has been demonstrated by FIG. 1a this is typically one second. In general it is believed that this is sufficient since once a likely target has been drawn to the observer's notice it may still be followed using the television presentation alone. If desired however, a simple technique of the linear projection of the position of the highlighted target at the time of detection may be employed, since most target speeds would be low compared to the speed of the aircraft.

As an alternative, the linear array of infra-red detectors extending at right angles to the flight path may be replaced by a smaller number of infra-red detectors extending in a linear array in the vertical and means (such as a rocking mirror or polygon) provided to scan the optical system of the vertical array in a horizontal direction.

We claim:

1. An airborne surveillance arrangement comprising an aircraft carrying a television system including television camera means for viewing a target area of the surface over which the aircraft is to fly lying ahead of said aircraft and a television display arrangement coupled to said television camera means for displaying the target area viewed by said television camera means, and an array of individual infra-red detectors imaged into space to view part of said target area to provide brighten-up signals for said display to highlight heat emitting targets in said display target area, said infra-red detector array being imaged into space with a directivity which is fixed in the direction of the flight path of said aircraft.

2. An arrangement as claimed in claim 1 and wherein said infra-red detection means comprises an array of individual infra-red detectors extending at right angles to the flight path of said aircraft and imaged into space so as to have substantially the same horizontal field of view at a desired target range as the television system.

3. An arrangement as claimed in claim 2 and wherein said linear array of individual infra-red detectors is mounted on a platform which is stabilised at least against roll.

4. An arrangement as claimed in claim 2 and wherein said infra-red detectors are thermo-electrically cooled mercury cadmium telluride detectors.

5. An arrangement as claimed in claim 2 and wherein said desired target range is the range to the centre of the target area viewed by said television camera.

6. An arrangement as claimed in claim 5 and wherein the output of each individual infra-red detector is arranged to be stored in a storage means, means are provided for reading out signals stored by said storage means, and means are provided for mixing signals read out from said storage means with video signals applied to said television display arrangement, whereby said read out signals act to brighten-up areas in the television display which correspond to the position of a heat emitting target in the target area.

7. An arrangement as claimed in claim 6 and wherein means are provided for chopping radiation falling upon said detectors so that the output of each detector comprises a carrier frequency, dependent upon the frequency of chopping, upon which wanted signals appear as modulation and the output of each detector is applied via individual impedance transforming means, individual narrow bandpass filter means and individual demodulating means to said storage means.

8. An arrangement as claimed in claim 7 and wherein between each individual demodulating means and said storage means is provided sharp cut-off low pass filter means and preferably again individual threshold detectors are provided for the output of each of said detectors whereby a degree of discrimination may be provided against responses which are not due to possible targets.

9. An arrangement as claimed in claim 2 and wherein means are provided for linearly projecting a computed position of a highlighted target when the last mentioned target is detected across said display.

10. A mobile surveillance arrangement comprising a television system including television camera means for viewing a scene and a television display arrangement coupled to said television camera means for displaying the scene viewed by said television camera means, and an array of individual infra-red detectors imaged into space to view part of the same scene as that viewed by said television camera means to provide brightenup signals for the scene displayed by said television display arrangement to highlight heat emitting targets in said part of said displayed scene, said infra-red detector array being imaged into space with a directivity which is fixed in a coordinate direction corresponding to the direction of movement of said mobile surveillance arrangement relative to said scene.

11. A mobile surveillance arrangement as claimed in claim 10 and wherein said infra-red detector array is imaged into space so as to have substantially the same field of view at a desired range as said television system in a coordinate direction at right angles to the direction of movement of said mobile surveillance arrangement.

* * * * *